United States Patent
Branch

(10) Patent No.: US 7,089,392 B2
(45) Date of Patent: Aug. 8, 2006

(54) METHOD, SYSTEM, AND PROGRAM FOR ALLOCATING STORAGE UNITS TO A DATA SET

(75) Inventor: Stephen M. Branch, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 329 days.

(21) Appl. No.: 10/434,613

(22) Filed: May 9, 2003

(65) Prior Publication Data

US 2004/0225855 A1 Nov. 11, 2004

(51) Int. Cl.
*G06F 12/00* (2006.01)

(52) U.S. Cl. .......................... 711/171; 711/112; 711/4; 711/173; 707/100

(58) Field of Classification Search ............... 711/112, 711/170, 171, 173, 4; 707/100
See application file for complete search history.

(56) References Cited

U.S. PATENT DOCUMENTS

| | | | |
|---|---|---|---|
| 5,634,028 A | 5/1997 | Brady et al. | |
| 5,978,810 A | 11/1999 | Mitchell et al. | |
| 6,055,602 A | 4/2000 | McIlvain et al. | |
| 6,088,764 A | 7/2000 | Shyam et al. | |
| 6,098,149 A | 8/2000 | Ofer et al. | |
| 6,119,208 A | 9/2000 | White et al. | |
| 6,122,646 A * | 9/2000 | Igarashi et al. | 707/205 |
| 6,192,450 B1 | 2/2001 | Bauman et al. | |
| 6,260,115 B1 | 7/2001 | Permut et al. | |
| 6,275,910 B1 | 8/2001 | Kanda et al. | |
| 6,351,792 B1 | 2/2002 | Milillo | |
| 6,381,677 B1 | 4/2002 | Beardsley et al. | |
| 6,405,284 B1 * | 6/2002 | Bridge | 711/114 |
| 6,501,905 B1 * | 12/2002 | Kimura | 386/126 |
| 6,591,334 B1 * | 7/2003 | Shyam et al. | 711/112 |
| 2001/0029569 A1 | 10/2001 | Kanda et al. | |
| 2002/0023070 A1 | 2/2002 | Branch et al. | |
| 2003/0046294 A1* | 3/2003 | Heronimus | 707/100 |

* cited by examiner

*Primary Examiner*—Brian R. Peugh
(74) *Attorney, Agent, or Firm*—David W. Victor; Konrad Raynes & Victor LLP

(57) ABSTRACT

Provided are a method, system, and program for allocating physical storage units to a data set, wherein one or more extents of storage units are assigned to the data set. A request is received to allocate additional storage units to the data set and a determination is made of a range of available storage units to allocate to the data set in response to the request. A determination is made of one pre-existing extent allocated in the data set before receiving the request and of whether at least one storage unit in the determined range can be allocated to the determined pre-existing extent. At least one storage unit in the determined range is allocated to the determined pre-existing extent if the at least one storage unit can be allocated to the determined pre-existing extent.

28 Claims, 5 Drawing Sheets

METHOD, SYSTEM, AND PROGRAM FOR ALLOCATING STORAGE UNITS TO A DATA SET

BACKGROUND OF THE INVENTION

1. Field of the Invention

The present invention is related to a method, system, and program for allocating storage units to a data set.

2. Description of the Related Art

In certain operating systems, such as the International Business Machines Corporation® ("IBM") Enterprise Systems Architecture (ESA), as z/OS™, OS/390®, etc., a logical data set may be defined to include non-sequential tracks in storage.** In such operating systems, to allocate physical storage space to a data set, the file system, such as the Data Facility Storage Management Subsystem (DFSMS), makes a call to obtain additional physical space. In the DFSMS file system the call is made to a Direct Access Device Space Management System (DADSM). To allocate space to a data set, a Data Set Control Block (DSCB) may be created in a file allocation table, such as a Volume Table of Contents (VTOC). The VTOC is a file allocation table defining physical storage space associated with logical volumes, files, etc. The file system will create an extent identifying a number of contiguous tracks allocated to the data set defined by the DSCB. Multiple extents may be included within a DSCB, such that the tracks included in each extent are sequential, however tracks between extents may be non-sequential.

**IBM, Z/OS and OS/390 are trademarks and/or registered trademarks of International Business Machines Corp.

In the prior art file systems, if all the available space in a data set is used, the file system will allocate additional space to the data set and generate and add a new extent to the DSCB entry in the file allocation table, such as a VTOC, for the data set to expand. The new extent will be allocated sufficient available sequential tracks to satisfy the request for additional space. If one new extent is not enough to satisfy the request for additional space, then the file system will locate additional ranges of sequential tracks to allocate to further extents, where the tracks between extents may be non-sequential although the tracks within one extent are sequential. If the DSCB is using the maximum number of allowed extents in the DSCB, then the file system will assign and create a new DSCB for the data set to include new extents to satisfy the request for additional space. A pointer to the new DSCB will be added to the pre-existing DSCB for the data set to allow for a chain of DSCBs to be associated with a data set.

There is a continued need in the art to provide improved techniques for optimizing the use of the data structures used to define data sets and other logical units.

SUMMARY OF THE PREFERRED EMBODIMENTS

Provided are a method, system, and program for allocating physical storage units to a data set, wherein one or more extents of storage units are assigned to the data set. A request is received to allocate additional storage units to the data set and a determination is made of a range of available storage units to allocate to the data set in response to the request. A determination is made of one pre-existing extent allocated in the data set before receiving the request and of whether at least one storage unit in the determined range can be allocated to the determined pre-existing extent. At least one storage unit in the determined range is allocated to the determined pre-existing extent if the at least one storage unit can be allocated to the determined pre-existing extent.

In further implementations, the determined pre-existing extent may comprise a last extent in the data set.

Yet further, the determined range of available storage units may comprise a range of sequential storage units.

Still further, the at least one storage unit in the determined range can only be allocated to the determined pre-existing extent if the determined range of available storage units comprises a range of sequential storage units that is sequential with respect to the storage units in the determined pre-existing extent.

Yet further, a determination may be made of at least one additional range of storage units if the determined range of storage units allocated to one extent is not sufficient to satisfy the request. In such case, at least one new extent is assigned to the data set and storage units from the at least one additional range of storage units are allocated to the allocated at least one new extent.

The described implementations provide techniques for allocating additional storage units, such as tracks, to a data sat that prefers to utilize preexisting extents to allocate additional data sets before creating additional extents or data sets for the allocation.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
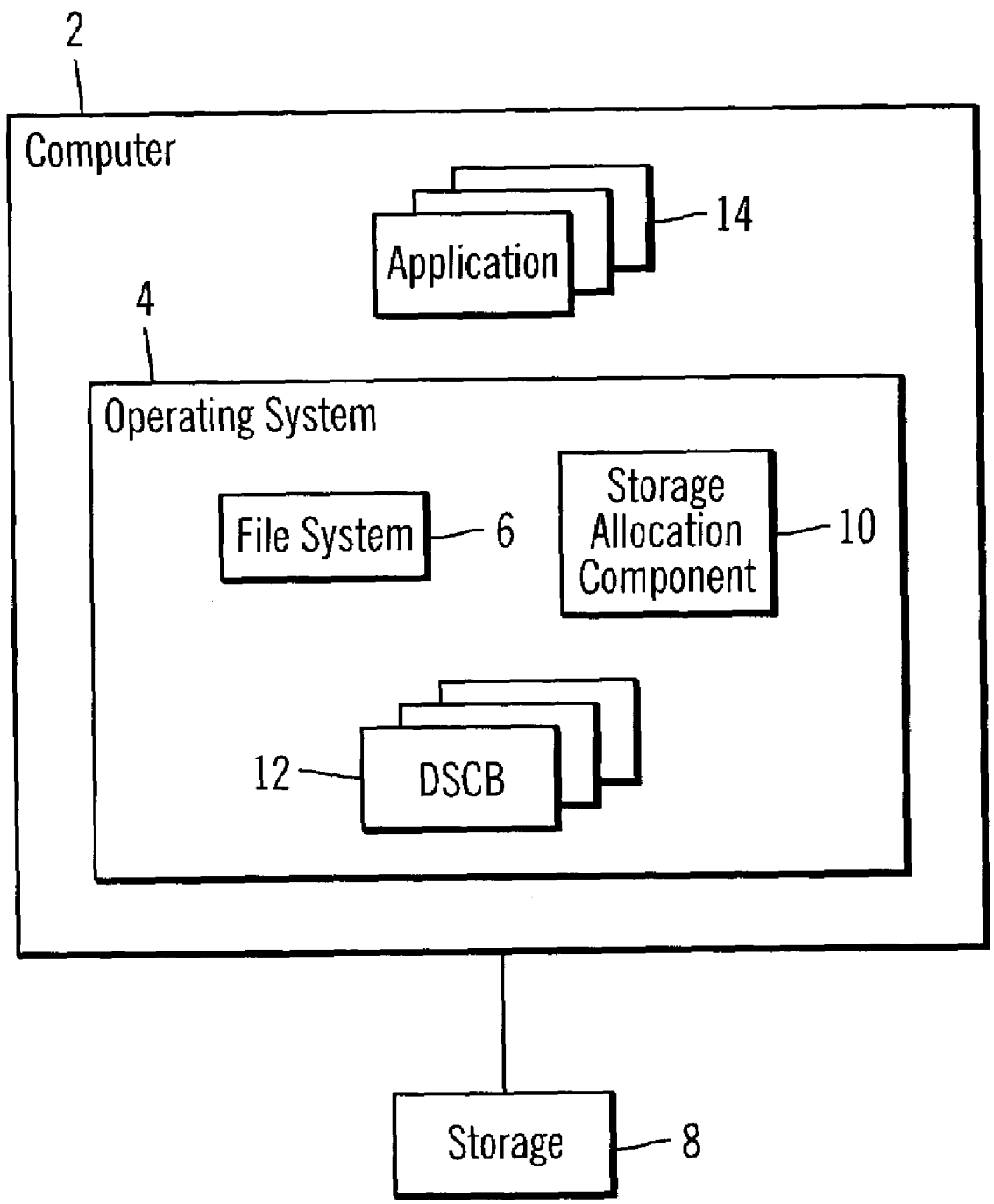
FIG. 1 illustrates a computing environment in which aspects of the invention are implemented.

FIG. 1 illustrates a computing environment in which aspects of the present invention are implemented. A computer 2 includes an operating system 4. The operating system 4 includes a file system 6 to manage the allocation of physical storage units, such as tracks or blocks, in a storage 8, to logical units, such as files, data sets, logical unit numbers (LUNs), volumes, or any other logical aggregation of data known in the art. A storage allocation component 10, which may be part of the file system 6, performs operations related to assigning physical storage units in the storage 8 to logical units. In certain implementations, the allocation of physical storage units in storage 8 to logical data sets may be implemented through one or more Data Set Control Blocks (DSCBs) 12. In alternative implementations, the storage allocation information may be maintained in different types of data structures, such as a File Allocation Table. The term "data set" as used herein refers to any type of logical data set used with any operating system known in the art, including file names, logical units (LUNs), volumes, etc. The term "data set" is not limited to any particular logical unit or operating system. One or more applications 14 executing in the computer 2 or a remote computer may perform data access operations with respect to any of the data sets defined in the data set allocation information maintained in the DSCBs 12.

The computer 2 may comprise any computing device known in the art, such as a server, workstation, storage controller, enterprise storage system, mainframe, laptop computer, hand held computer, telephony device, network appliance, virtualization device, etc. The operating system 4 may comprise any operating system known in the art that is capable of being configured to perform the operations described herein, such as the IBM OS390, z/OS, etc. The file system 6 may comprise any file management system known in the art, such as the IBM DFSMS file system, and the storage allocation component 10 may comprise any program capable of being configured to perform the allocation operations described herein, such as the DADSM program. The storage allocation component 10 may be part of the file system 6, or a separate program component, and the file system 6 may be part of the operating system 4.

Figure 2:
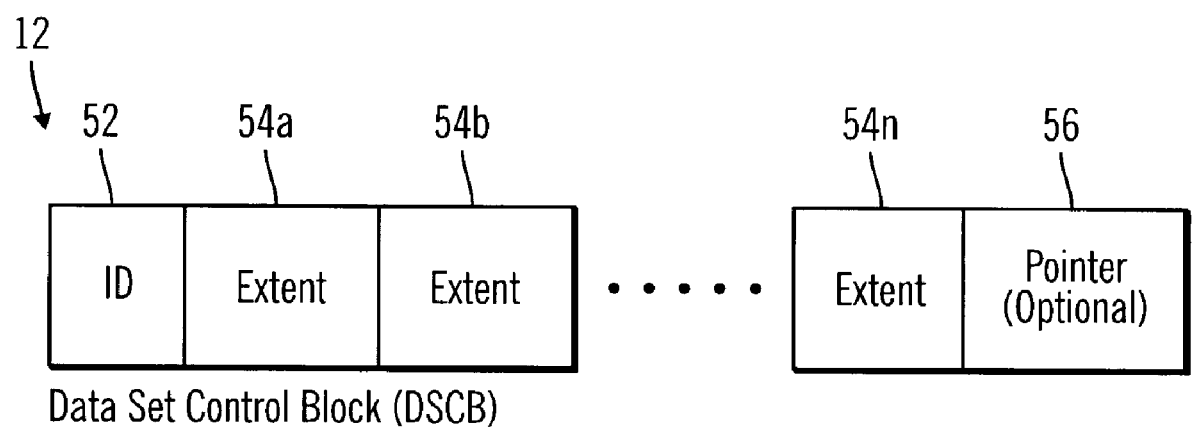
FIG. 2 illustrates information included in a data set control block as known in the prior art.

FIG. 2 illustrates one implementation of the data structure and format of a DSCB 12. Each DSCB 12 includes an identifier (ID) 52, one or more extents 54a, 54b . . . 54n, and an optional pointer 56 to another DSCB entry to provide further extents of tracks if there is no further available room in the current DSCB entry for additional extents 54a, 54b . . . 54n. Each extent 54a, 54b . . . 54n identifies a sequential range of tracks in storage 8 allocated to the data set defined by the DSCB 12, where the ranges of tracks between extents may be non-sequential. In this way, non-sequential chunks or ranges of physical tracks in storage 8 may be allocated to a logical data set. A DSCB 12 may include additional fields and information maintained with the data allocation information as known in the art.

Figure 3:
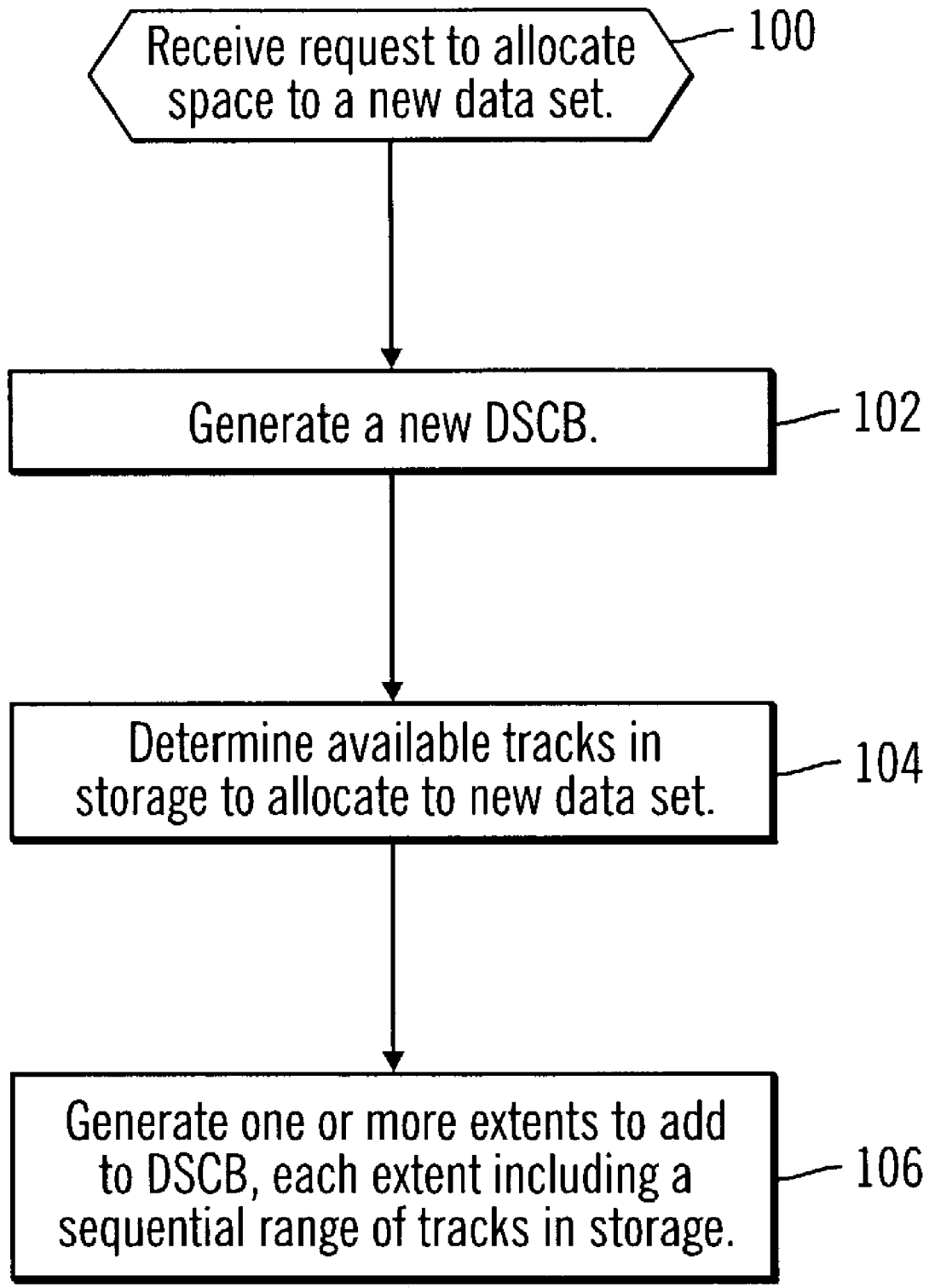
FIGS. 3 and 4 illustrate logic to allocate tracks to a logical data set in accordance with implementations of the invention.

FIG. 3 illustrates operations performed by the storage allocation component 10 to process a request to allocate tracks in storage 8 to a new data set. This call would be initiated by the file system 6, which may request the creation of a new data set in response to a request from one application 14 or from within the file system 6 itself. Upon receiving (at block 100) the request to create a new data set, the storage allocation component 10 generates (at block 102) a new DSCB 12 (FIG. 2). The storage allocation component 10 then determines (at block 104) groups of one or more chunks or ranges of available sequential tracks in storage 8 to allocate to the new data set to satisfy the request. One or more extents 54a, 54b . . . 54n are then generated (at block 106), where each determined group of sequential tracks is included in one or more of the generated extents. In certain implementations, the determined ranges of track may include the range having the maximum number of sequential tracks in storage that is sufficient to meet the requested demand for storage space.

Figure 4:
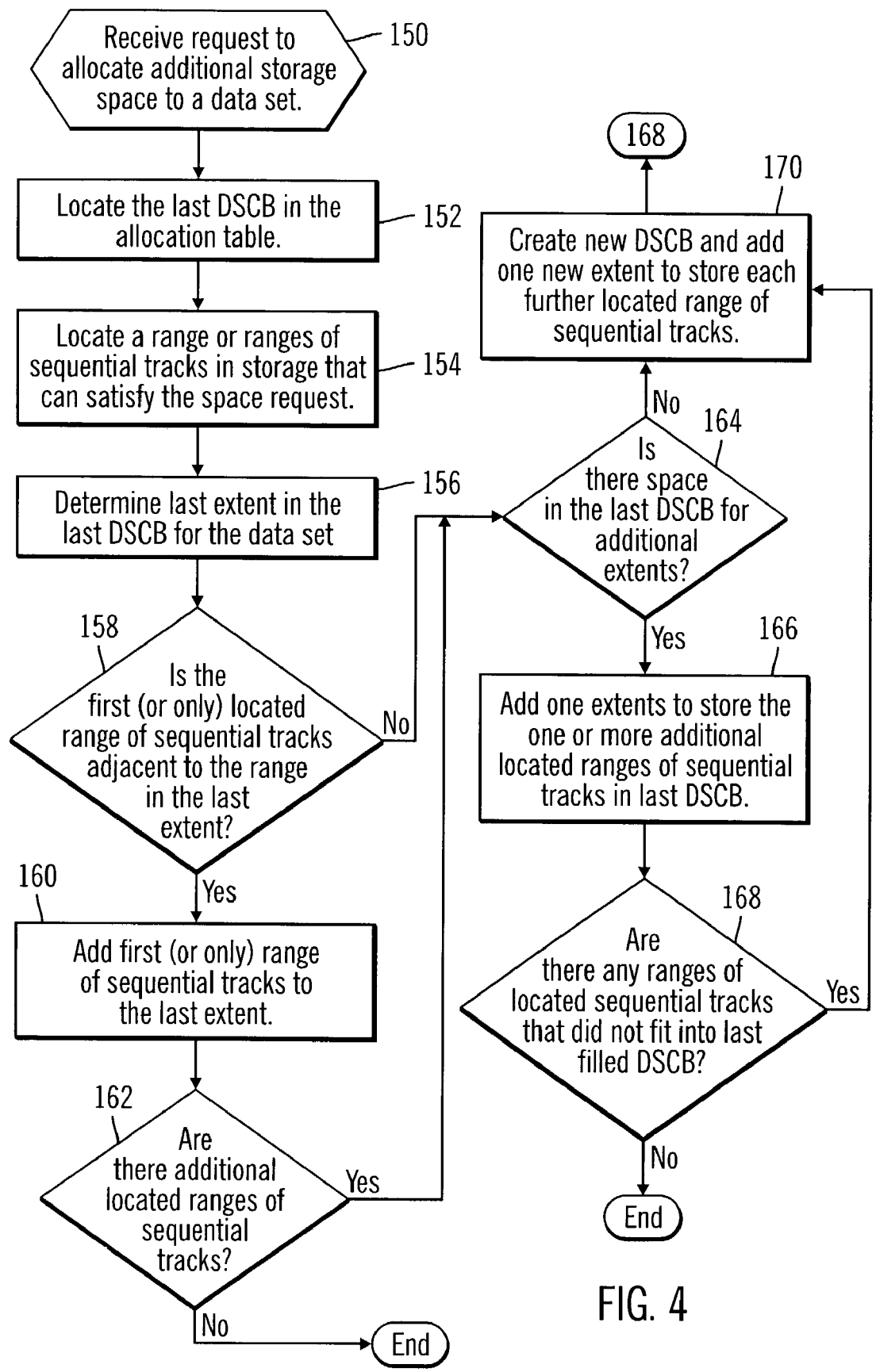

FIG. 4 illustrates operations performed by the storage allocation component 10 to process a request to allocate additional tracks in storage 8 to a preexisting data set, defined by at least one preexisting DSCB 12. The request to allocate additional tracks may specify an amount of space to add, or the storage allocation component 10, may allocate a default amount of space. Upon receiving (at block 150) a request to allocate additional space to a preexisting data set, the storage allocation component 10 locates (at block 152) the last DSCB 12 in a chain of linked DSCBs. One or more ranges of available sequential tracks are located (at block 154) in storage 8 that can satisfy the allocation request. In locating one or more ranges of sequential tracks, the storage allocation component 10 may seek a range of sequential tracks sufficient to satisfy the request in a single extent. If there is no range of sequential tracks capable of fitting in a single extent that can satisfy the request, then multiple ranges of sequential tracks are obtained. The located ranges of sequential tracks may or may not be adjacent to the range of sequential tracks in the last extent of the last DSCB. In certain implementations, the storage allocation component 10 may first locate a range of tracks capable of fitting in a single extent that are adjacent to the last extent of the last DSCB.

The storage allocation component 10 further determines (at block 156) the last extent in the determined last DSCB 12. If (at block 158) the first (or only) located range of sequential tracks is adjacent to the range of sequential tracks in the determined last extent of the last DSCB 12, then the first (or only) range of located sequential tracks is added (at block 160) to the last extent. From the yes branch of block 162 or the no branch of block 158, if (at block 164) there is space in the last DSCB for additional extents, then one extent is added (at block 166) to store the one or more additional located ranges of sequential tracks in the last DSCB 12. If (from the yes branch of block 168) there are any ranges of located sequential tracks that were not added to extents in the last filled DSCB 12 or if there is no further space in the last DSCB 12 (from the no branch of block 164), then the storage allocation component 10 creates (at block 170) a new DSCB 12 and adds one extent to store each further located range of sequential tracks. Control then proceeds to block 168 to process any further located ranges of sequential tracks that have not yet been added to an extent.

Described implementations seek to maximize the number of tracks added to extents when allocating additional tracks to a data set to conserve the use of extents and increase the number of sequential tracks included in a data set which may have non-sequential tracks.

ADDITIONAL IMPLEMENTATION DETAILS

The storage allocation techniques disclosed herein may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the described implementations, the determined ranges of tracks each added to an extent comprised sequential tracks. In alternative implementations, the range of tracks assigned to an extent may comprise non-sequential tracks.

In the described implementations, an attempt is first made to add tracks to a last extent in the DSCB. In alternative implementations, tracks may be allocated to an extent other than the last extent added to the DSCB.

In the described implementations, physical units from a non-volatile storage unit were allocated to logical data sets. The described implementations may further be used to allocation storage units in alternative types of media to logical data sets, such as volatile storage devices, etc.

FIGS. 3 and 4 describe specific operations occurring in a particular order. In alternative implementations, certain operations may be performed in a different order, modified or removed. Morever, steps may be added to the above described logic and still conform to the described implementations. Further, operations described herein may occur sequentially or certain operations may be processed in parallel. Yet further, operations may be performed by a single processing unit or by distributed processing units.

Figure 5:
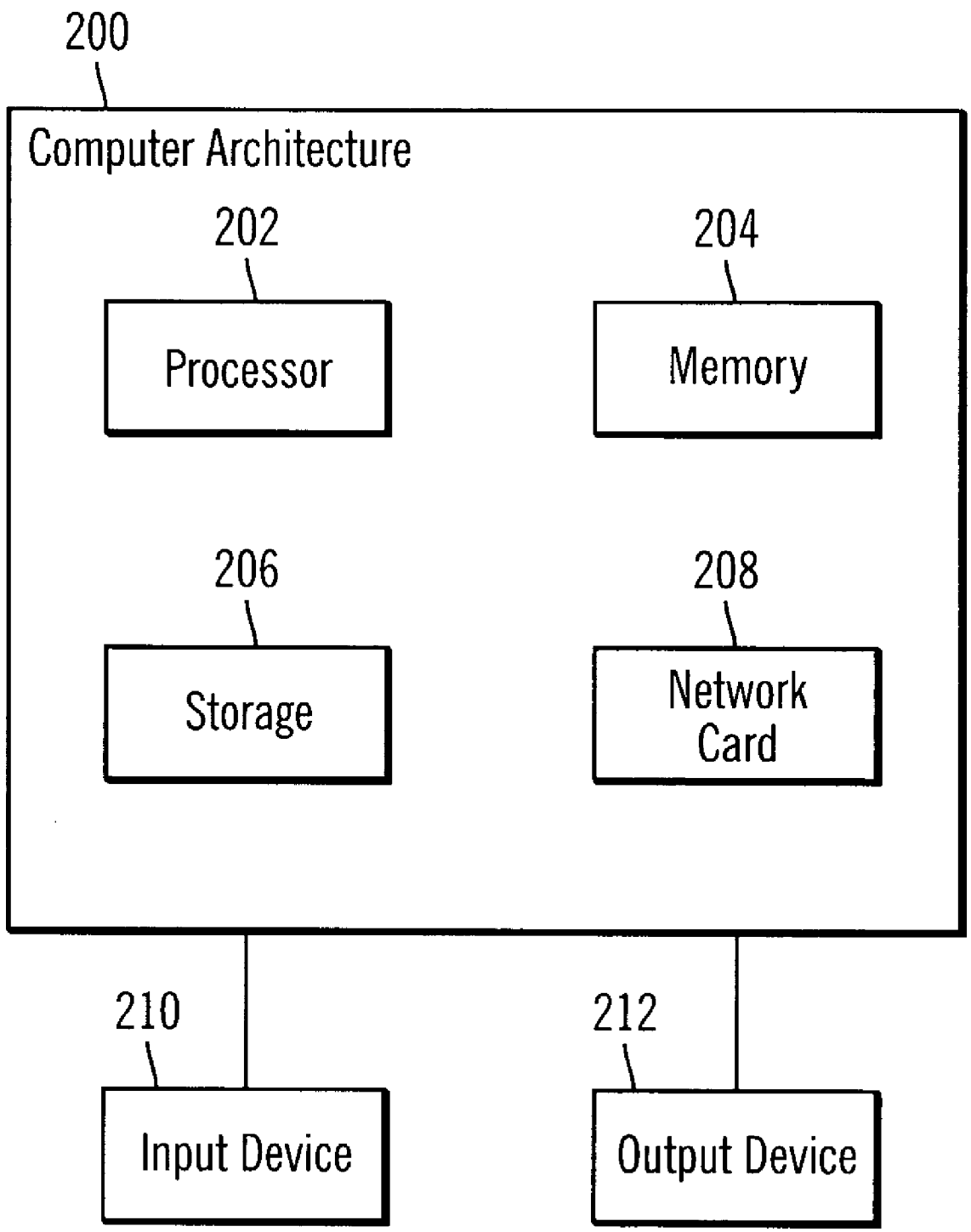
FIG. 5 illustrates a computer architecture that may be used to implement the computer described with respect to FIG. 1.

FIG. 5 illustrates one implementation of a computer architecture 200 of the computer shown in FIG. 1. The architecture 200 may include a processor 202 (e.g., a microprocessor), a memory 204 (e.g., a volatile memory device), and storage 206 (e.g., a non-volatile storage, such as magnetic disk drives, optical disk drives, a tape drive, etc.). The storage 206 may comprise an internal storage device or an attached or network accessible storage. Programs in the storage 206 are loaded into the memory 304 and executed by the processor 202 in a manner known in the art. The architecture further includes a network card 208 to enable communication with a network. An input device 210 is used to provide user input to the processor 202, and may include a keyboard, mouse, pen-stylus, microphone, touch sensitive display screen, or any other activation or input mechanism known in the art. An output device 212 is capable of rendering information transmitted from the processor 202, or other component, such as a display monitor, printer, storage, etc.

The foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for allocating physical storage units to a data set, wherein one or more extents of storage units are assigned to the data set, comprising:
    receiving a request to allocate additional storage units to the data set;
    determining a range of available storage units to allocate to data set in response to the request;
    determining one pre-existing extent allocated in the data set before receiving the request;
    determining whether at least one storage unit in the determined range of available storage units can be allocated to the determined pre-existing extent; and
    allocating at least one storage unit in the determined range of available storage units to the determined pre-existing extent if the at least one storage unit can be allocated to the determined pre-existing extent.

2. The method of claim 1, wherein the determined pre-existing extent comprises a last extent in the data set.

3. The method of claim 1, wherein the determined range of available storage units comprises a range of sequential storage units, and wherein the determined range of available storage units comprises a range of sequential storage units that is sequential with respect to the storage units in the determined pre-existing extent.

4. The method of claim 3, wherein the determined pre-existing extent comprises a last extent in the data set.

5. The method of claim 1, wherein the at least one storage unit in the determined range can only be allocated to the determined pre-existing extent if the determined range of available storage units comprises a range of sequential storage units that is sequential with respect to the storage units in the determined pre-existing extent.

6. The method of claim 1, further comprising:
    allocating at least one new extent to the data set; and
    allocating unallocated storage units from the determined range that could not be allocated to the pre-existing extent to the at least one new added extent.

7. The method of claim 6, wherein the data set is associated with at least one control block, wherein extents are assigned to the at least one control block associated with the data set, and wherein allocating the at least one new extent to the data set further comprises:
    allocating the new extent to a pre-existing control block associated with the data set if the at least one new extent can be allocated to the pre-existing control block or one new control block associated with the data set if the at least one new extent cannot be allocated to the pre-existing control block, wherein the new control block is assigned to the data set after determining that the at least one new extent cannot be allocated to the pre-existing control block.

8. The method of claim 1, further comprising:
    determining at least one additional range of storage units if the determined range of storage units allocated to the preexisting extent or a last extent allocated to the data set following the request is not sufficient to satisfy the request;
    assigning at least one new extent to the data set; and
    allocating storage units from the at least one additional range of storage units to the allocated at least one new extent.

9. The method of claim 8, wherein the data set is associated with at least one control block, wherein extents are allocated to the at least one control block associated with the data set, and wherein allocating the at least one new extent to the data set further comprises:
    allocating the new extent to a pre-existing control block associated with the data set if the at least one new extent can be allocated to the pre-existing control block;
    allocating one new control block associated with the data set if the at least one new extent cannot be allocated to the pre-existing control block, wherein the new control block is assigned to the data set after determining that the at least one new extent cannot be allocated to the pre-existing control block.

10. A system for allocating physical storage units to a data set, wherein one or more extents of storage units are assigned to the data set comprising:
- a storage device in which a plurality of storage units are configured;
- means for receiving a request to allocate additional storage units to the data set;
- means for determining a range of available storage units to allocate to the data set in response to the request;
- means for determining one pre-existing extent allocated in the data set before receiving the request;
- means for determining whether at least one storage unit in the determined range of available storage units can be allocated to the determining pro-existing extent; and
- means for allocating at least one storage unit in the determined range of available storage units to the determined pre-existing extent if the at least one storage unit can be allocated to the determined pre-existing extent.

11. The system of claim 10, wherein the determined pre-existing extent comprises a last extent in the data set.

12. The system of claim 10, wherein the determined range of available storage units comprises a range of sequential storage units, and wherein the determined range of available storage units comprises a range of sequential storage units that is sequential with respect to the storage units in the determined pre-existing extent.

13. The system of claim 12, wherein the determined pre-existing extent comprises a last extent in the data set.

14. The system of claim 10, wherein the at least one storage unit in the determined range can only be allocated to the determined pre-existing extent if the determined range of available storage units comprises a range of sequential storage units that is sequential with respect to the storage units in the determined pre-existing extent.

15. The system of claim 10, further comprising:
- means for allocating at least one new extent to the data set; and
- means for allocating unallocated storage units from the determined range that could not be allocated to the pre-existing extent to the at least one new added extent.

16. The system of claim 15, wherein the data set is associated with at least one control block, wherein extents are assigned to the at least one control block associated with the data set, and wherein the means for allocating the at least one new extent to the data set further performs:
- allocating the new extent to a pre-existing control block associated with the data set if the at least one new extent can be allocated to the pre-existing control block or one new control block associated with the data set if the at least one new extent cannot be allocated to the pre-existing control block, wherein the flew control block is assigned to the data set after determining that the at least one new extent cannot be allocated to the pre-existing control block.

17. The system of claim 10, further comprising:
- means for determining at least one additional range of storage units if the determined range of storage units allocated to the preexisting extent or a last extent allocated to the data set following the request is not sufficient to satisfy the request;
- means for assigning at least one new extent to the data set; and
- means for allocating storage units from the at least one additional range of storage units to the allocated at least one new extent.

18. The system of claim 17, herein the data set is associated with at least one control block, wherein extents are allocated to the at least one control block associated with the data set, and wherein the means for allocating the at least one new extent to the data set further performs:
- allocating the new extent to a pre-existing control block associated with the data set if the at least one new extent can be allocated to the pre-existing control block;
- allocating one new control block associated with the data set if the at least one new extent cannot be allocated to the pre-existing control block, wherein the new control block is assigned to the data set after determining that the at least one new extent cannot be allocated to the pre-existing control block.

19. A device implementing logic for allocating physical storage units to a data set, wherein one or more extents of storage units are assigned to the data set, and wherein the logic causes operations to be performed, the operations comprising:
- receiving a request to allocate additional storage units to the data set;
- determining a range of available storage units to allocate to the data set in response to the request;
- determining one pre-existing extent allocated in the data set before receiving the request;
- determining whether at least one storage unit in the determined range of available storage units can be allocated to the determined pre-existing extent; and
- allocating at least one storage unit in the determined range of available storage units to the determined pre-existing extent if the at least one storage unit can be allocated to the determined pre-existing extent.

20. The device of claim 19, wherein the determined pre-existing extent comprises a last extent in the data set.

21. The device of claim 19, wherein the determined range of available storage units comprises a range of sequential storage units, and wherein the determined range of available storage units comprises a range of sequential storage units that is sequential with respect to the storage units in the determined pre-existing extent.

22. The device of claim 21, wherein the determined pre-existing extent comprises a last extent in the data set.

23. The device of claim 19, wherein the at least one storage unit in the determined range can only be allocated to the determined pre-existing extent if the determined range of available storage units comprises a range of sequential storage units that is sequential with respect to the storage units in the determined pre-existing extent.

24. The device of claim 19, further comprising:
- allocating at least one new extent to the data set; and
- allocating unallocated storage units from the determined range that could not be allocated to the pre-existing extent to the at least one new added extent.

25. The device of claim 24, wherein the data set is associated wit at least one control block, wherein extents are assigned to the at least one control block associated with the data set, and wherein allocating the at least one new extent to the data set further comprises:
- allocating the new extent to a pre-existing control block associated with the data set if the at least one new extent can be allocated to the pre-existing control block or one new control block associated with the data set if the at least one new extent cannot be allocated to the pre-existing control block, wherein, the new control block is assigned to the data set after determining that the at least one new extent cannot be allocated to the pre-existing control block.

26. The device of claim 19, further comprising:

determining at least one additional range of storage units if the determined range of storage units allocated to the preexisting extent or a last extent allocated to the data set following the request is not sufficient to satisfy the request;

assigning at least one new extent to the data set; and allocating storage units from the at least one additional range of storage units to the allocated at least one new extent.

27. The device of claim 26, wherein the data set is associated with at least one control block, wherein extents are allocated to the at least one control block associated with the data set, and wherein allocating the at least one new extent to the data set further comprises:

allocating the new extent to a pre-existing control block associated with the data set if the at least one new extent can be allocated to the pre-existing control block;

allocating one new control block associated with the data set if the at least one new extent cannot be allocated to the pre-existing control block, wherein the new control block is assigned to the data set after determining that the at least one new extent cannot be allocated to the pre-existing control block.

28. The device of claim 19, wherein the device comprises computer readable logic or a hardware component.

* * * * *